June 3, 1969  A. MESZAROS  3,447,827
ROAST LIFTER
Filed Dec. 18, 1967
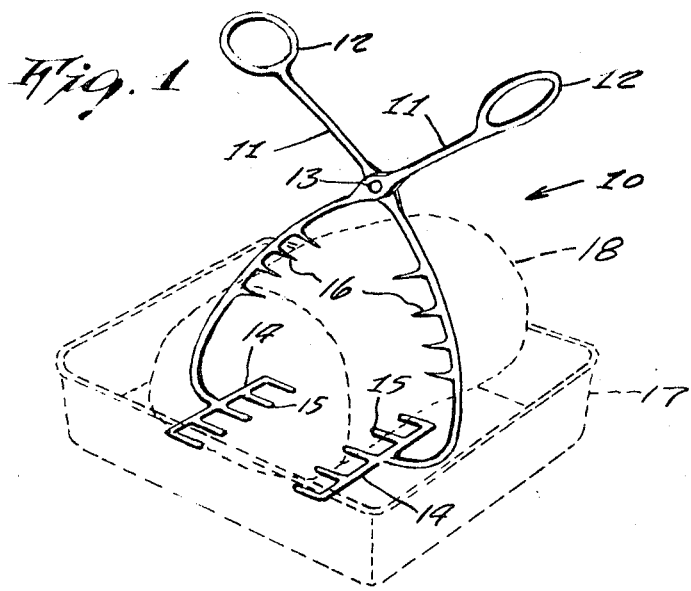
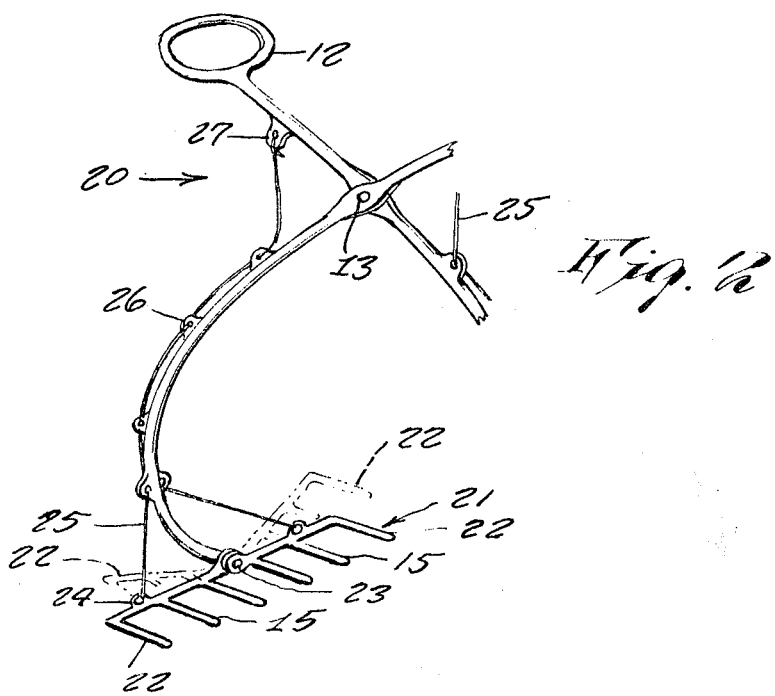
INVENTOR.
ALBERT MESZAROS

United States Patent Office 3,447,827
Patented June 3, 1969

3,447,827
ROAST LIFTER
Albert Meszaros, 24 Easter Ave.,
Ossining, N.Y. 10562
Filed Dec. 18, 1967, Ser. No. 691,309
Int. Cl. A47g 21/10
U.S. Cl. 294—3                        3 Claims

ABSTRACT OF THE DISCLOSURE

A specially designed pair of tongs for lifting a roasted meat or turkey out of a roasting pan, the tongs having toothed racks that slip within a narrow space between the meat and sides of the rotating pan and then slip below the meat to form a firm grip thereof.

---

This invention relates generally to tongs. More specifically it relates to devices for lifting roasts and the like from a roasting pan.

It is generally well known to most homemakers that it is usually difficult to lift a large roast or turkey from a roasting pan due to the lack of space between the meat and the sides of the roasting pan, thus not allowing introduction of a conventional kitchen tool therebetween so to pry out the meat. This is of course objectional and in want of improvement.

Accordingly, it is a principal object of the present invention to provide a roast lifter which can be readily inserted within a limited space around a roasted meat within a roasting pan, so as to raise the meat from the pan.

Another object is to provide a roast lifter that will readily slide under the bottom of the roast meat so to provide a better hold for raising the same.

Yet another object is to provide a roast lifter wherein a grasping toothed rack is self-arching so to prevent the lifting meat from falling off sidewardly from the present device.

Other objects are to provide a roast lifter which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention, and

FIGURE 2 is a fragmentary perspective view of a modified form of the invention.

Referring now to the drawing in detail, the reference numeral 10 represents a roast lifter according to the present invention, wherein there are a pair of intersecting levers 11 made preferably from stainless steel or a like metal, each lever having a handle 12 at one end, the handles comprising looped terminal ends to form central openings into which a person may insert the fingers of the hands. The levers are connected pivotally free at an intermediate point by means of a rivet 13.

At their opposite ends, each lever has a rack 14 comprised of teeth 15. The teeth of the two racks project toward each other.

Along a portion of each lever located between the rivet and rack, there are a plurality of spurs 16, the spurs of one lever pointing toward the spurs of the other lever.

In operative use, the roast lifter is inserted into the roasting pan 17 around the meat 18 and the racks drawn under therebeneath, while at same time the spurs pierce the sides of the meat to prevent it from rolling off sideways when lifted.

In FIGURE 2, a modified roast lifter 20 is shown wherein each lever has a rack 21 comprised of a pair of rack members 22 pivotally connected together on a pin 23 secured in the lever end. A wire or cord 25 is connected at one end to an eye 24 near the outer end of each rack member 22, the cord being threaded through eyes 26 along the lever, and the opposite end of the cord being secured to eye 27 near the handle on the opposite lever.

In operative use, when the lifter is closed, the cord will pull the rack elements into an arched position as indicated by the phantom lines thus serving to prevent the meat from falling off sidewardly from the lifter.

While various changes may be made in the detail construction, it is understood that such changes will be within the spirit and scope of the present invention as is defined by the appended claims.

Having described my invention, what I claim as new and desire to secure by Letters Patent is:

1. In a roast lifter, the combination of a pair of levers interconnected pivotally free at an intermediate portion by means of a rivet, a looped handle at one end of each lever, and a toothed rack at the opposite end of each lever, said teeth of one rack pointing toward the teeth of the other rack and each said rack being comprised of a pair of rack members pivoted together at one end on a pin secured in the end of said lever, each rack member having an eye near an opposite end, one end of a cord or wire secured to said eye and threaded through a series of eyes along said lever, the opposite end of said cord or wire being connected to an eye located near said handle on the opposite lever.

2. The combination as set forth in claim 1 wherein each lever has a plurality of spurs along a portion between said rack and said rivet, said spurs of one lever pointing toward the spurs of the other lever.

3. In a roast lifter, the combination of a pair of pivotally interconnected levers each of which has a toothed rack at one end thereof comprised of a pair of pivotally connected rack members, and means connected to at least one of said pair of levers and to at least one of said pair of rack members for pulling said one pair of rack members into an arched position.

References Cited

UNITED STATES PATENTS

| | | | |
|---|---|---|---|
| 228,865 | 6/1880 | Case | 294—28 |
| 2,757,951 | 8/1956 | Benton | 294—16 |
| 3,367,703 | 2/1968 | Pittis | 294—16 |

ANDRES H. NIELSEN, *Primary Examiner.*